UNITED STATES PATENT OFFICE 2,642,416

FLUORINATED ACRYLATES AND POLYMERS

Arthur H. Ahlbrecht, White Bear Township, Ramsey County, Thomas S. Reid, New Canada Township, Ramsey County, and Donald R. Husted, St. Paul, Minn., assignors to Minnesota Mining & Manufacturing Company, St. Paul, Minn., a corporation of Delaware No Drawing. Application January 9, 1952, Serial No. 265,713

16 Claims. (Cl. 260—83.5)

This application is a continuation-in-part of our copending application S. N. 164,612, filed on May 26, 1950 (now abandoned).

This invention relates to our discovery of a new and useful class of unsaturated reactive fluorocarbon compounds and their polymers.

These new compounds are the 1,1-dihydroperfluoroalkyl acrylate esters that have in the molecule a fully fluorinated terminal fluorocarbon chain containing from 3 to 9 carbon atoms, which can be either a straight chain or a branched chain. These compounds are the esters of acrylic acid ($CH_2$:CHCOOH) and the 1,1-dihydroperfluoroalkyl alcohols ($C_nF_{2n+1}CH_2OH$). They have the generic formula:

$$CH_2:CHCOOCH_2C_nF_{2n+1}$$

where $n$ has an integer value of 3 to 9.

These esters are high-boiling colorless liquids and have low refractive indices (below 1.35). They are highly reactive and polymerizable. Certain of them can be used for making rubbery polymers having unusual properties and capable of vulcanization. The presence in the molecule of a fluorocarbon chain makes it possible to use these esters in preparing derivatives and polymers that have a fluorocarbon terminal-chain or side-chain structure. The first member of our series of acrylate esters is 1,1-dihydroheptafluorobutyl acrylate ($CH_2$:CHCOOCH$_2$C$_3$F$_7$); and the second member is 1,1-dihydrononafluoroamyl acrylate ($CH_2$:CHCOOCH$_2$C$_4$F$_9$). These may also be designated as 1,1-dihydroperfluorobutyl acrylate and 1,1-dihydroperfluoroamyl acrylate, respectively.

Fluorocarbon chains have unique properties in respect to solubility and surface active properties. They are both oleophobic and hydrophobic. They are highly stable and inert. Their presence in compounds and polymers results in unique properties. A fluorocarbon chain having three or more fully-fluorinated carbon atoms differs importantly from a single trifluoromethyl group ($CF_3$—) and even from a pentafluoroethyl group ($CF_3CF_2$—), especially when present in a molecule that also contains a hydrophilic active group, or contains hydrogenated carbon atoms, or both.

All of the present ester compounds contain at least three fluorinated carbon atoms and at least seven fluorine atoms in the molecule, and the number of fluorine atoms exceeds the number of hydrogen atoms. The number of fluorinated carbon atoms equals or exceeds the number of hydrogenated carbon atoms. The percentage by weight of fluorine exceeds 50%.

The following table lists the approximate boiling points (at 740 mm.) of the normal (straight chain) acrylate esters of this invention:

| Fluorinated alkyl group | Ester formula | B. P. (° C.) |
|---|---|---|
| Butyl | $CH_2$:CHCOOCH$_2$(CF$_2$)$_2$CF$_3$ | 122 |
| Amyl | $CH_2$:CHCOOCH$_2$(CF$_2$)$_3$CF$_3$ | 139 |
| Hexyl | $CH_2$:CHCOOCH$_2$(CF$_2$)$_4$CF$_3$ | 157 |
| Heptyl | $CH_2$:CHCOOCH$_2$(CF$_2$)$_5$CF$_3$ | 172 |
| Octyl | $CH_2$:CHCOOCH$_2$(CF$_2$)$_6$CF$_3$ | 188 |
| Nonyl | $CH_2$:CHCOOCH$_2$(CF$_2$)$_7$CF$_3$ | 204 |
| Decyl | $CH_2$:CHCOOCH$_2$(CF$_2$)$_8$CF$_3$ | 220 |

The refractive index of the pure normal 1,1-dihydroheptafluorobutyl acrylate at 20° C. ($n_D^{30}$) is 1.3318, and it is of interest to note that this value is very nearly the same as that for pure water (1.3330 at 20° C.).

Examples of branched chain esters are 1,1-dihydroheptafluoroisobutyl acrylate, $$CH_2:CHCOOCH_2CF(CF_3)_2$$

and 1,1-dihydrononafluoroisoamyl acrylate, $$CH_2:CHCOOCH_2CF_2CF(CF_3)_2$$

which have boiling points slightly lower than those of the corresponding normal (straight chain) esters.

The homopolymerization of the ester monomers is readily carried out in bulk, solution and emulsion. The compositional structure of these homopolymers is indicated by the following generic formula (wherein $n$ has a value of 3 to 9):

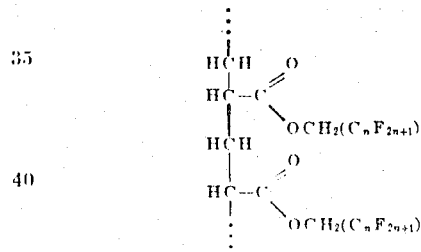

The above formula shows two adjacent acrylate ester units of the high-polymer linear chain, which contains a large number of such units. The vinyl groups supplied by the ester units provide the linear skeletal chain of the polymer molecule. The perfluoroalkyl groups (—$C_nF_{2n+1}$) provide terminal fluorocarbon side chains containing three or more fully fluorinated carbon atoms, the terminal group being a —$CF_3$ group. In the case of heteropolymers, formed by copolymerizing our acrylate esters with other polymerizable monomers containing an ethylenic linkage, the skeletal chain of the polymer molecule will contain acrylate ester units of the type indicated by the above formula as well as units supplied by the co-monomer.

The presence of the oxy-carbonyl groups imparts desirable combinative properties to the polymer. In particular, these active groups enhance adhesion when the polymer is coated on a surface, and produce tackiness in the polymers shortly to be described. Although fluorocarbons have a low affinity for surfaces with which brought into contact, the polymers of the present esters form tenacious films when coated upon a variety of surfaces, including cloths, papers, cellulosic films and metals; due, apparently, to the binding action of the oxy-carbonyl groups and to molecular orientation under the conditions involved in applying surface coatings.

The ester monomers polymerize in bulk at room temperature when light is used as an initiator. They polymerize, even in the absence of light, at moderately elevated temperatures (usually 50 to 100° C.), and readily so in the presence of peroxides or other free radical chain starters.

Solution polymerization can be carried out, preferably in a fluorinated solvent. Methyl and ethyl esters of perfluoro monocarboxylic acids, for example methyl heptafluorobutyrate and methyl trifluoroacetate, are particularly good as solvents. Peroxide catalysts of the solid or liquid variety (benzoyl peroxide, cumene hydroperoxide, etc.) are suitable for initiation in this system, but other free radical catalysts can also be used.

Emulsion polymerization in aqueous media is the preferred procedure, yielding stable translucent latices with a light blue coloration, the latter being due to light-scattering by the minute suspended particles (Tyndall effect). Stable latices containing 25–35% solids can be readily obtained. The butyl acrylate latices are clear and transparent owing to the fact that the refractive index of the suspended particles is approximately the same as that of water. (In contrast, the polymers of ethyl and propyl esters form milky emulsions.) The latices can be coated and air-dried to form thin films of the polymers. Coagulation of the latices can be readily effected by freezing, or by diluting and adding an ionic coagulating agent (such as barium chloride).

The preferred emulsifiers used in emulsion polymerization procedures are of the sodium alkyl sulfate type (such as Du Pont's "Duponol ME"), but other cationic and anionic emulsifiers can be used. Alkali metal salts of persulfuric acid are good catalysts, but peroxides and diazo initiators can be used. Mercaptans (such as tertiary hexadecyl mercaptan) can be included to obtain a lower average molecular weight of the polymer, serving as chain transfer agents. Polymerization readily occurs at moderately elevated temperatures (e. g., 40 to 60° C.) and, when proper precautions are observed to keep air and other inhibitors from the system, will ordinarily be complete within 24 hours, although the higher acrylates may require additional time.

The following is a typical example of an emulsion polymerization recipe for making rubbery polymers:

| | Parts by weight |
|---|---|
| 1,1-dihydroperfluoroalkylacrylate | 100 |
| Water | 180 |
| Mercaptan | 0.10 |
| "Duponol ME" | 3.0 |
| Sodium persulfate ($Na_2S_2O_8$) | 0.5 |

The presence of the mercaptan in this formula results in a lower average molecular weight and the polymer is easier to handle in milling or molding, having a better flow characteristic. A tougher polymer results when it is omitted.

When fully polymerized, the homopolymers of the present esters are soft but solid, thermoplastic, rubbery or non-rubbery materials. The esters of shorter fluorocarbon chain length yield rubbery polymers and the esters of longer fluorocarbon chain length yield non-rubbery, plastic or waxy polymers. Thus rubbery polymers can be obtained from the normal butyl, amyl and hexyl esters; and soft, plastic or waxy polymers from the normal octyl, nonyl and decyl esters.

These rubbery polymers are tacky in the pure state if the surface is not contaminated. A freshly formed coagulum will seem tack-free if it has not been thoroughly dried, owing to the presence of moisture on the surface. Even a piece of dried polymer when rolled between the fingers may seem non-tacky, owing to contamination of the surface by oil from the skin. For these reasons the tacky characteristic was not discovered in our earliest experiments.

This tacky quality is desirable in various connections. It makes for greater adhesion of coatings to base surfaces. Ribbons or tapes of the polymer can be wound in overlapping relation and will cohere at the contacting surfaces.

These tacky rubbery polymers have value in making adhesives. The degree of tackiness can be increased by compounding with a compatible tackifier material, such as a sticky viscous polymer made from our esters as hereinafter described. Such adhesives have value in making normally tacky, pressure-sensitive adhesive tapes, the adhesive being coated upon a desired flexible backing. A particularly interesting adhesive tape can be made by coating the adhesive on a film backing of polytetrafluoroethylene (such as Du Pont's "Teflon"). This adhesive tape has a high degree of chemical inertness and is highly waterproof and oilproof, and has excellent electrical properties.

The homopolymers of our esters are also noteworthy in being nonflammable, and in being resistant to oils, hydrocarbons and other common organic solvents, as well as being water-repellent. They are oleophobic as well as being hydrophobic. These properties result from the length of the fluorocarbon chains, and the high fluorine content (over 50% by weight) of these polymers. They are also characterized by having low dielectric constants and low refractive indices (below 1.35).

The rubbery polymers can be used as nonflammable coatings, and in making gaskets, which have exceptional utility for many purposes where the above-mentioned properties are of importance. They are highly resistant to gasoline and oils, retain flexibility at low temperatures, and are highly resistant to ozone.

The non-rubbery, plastic and waxy, polymers also have value as coatings and impregnants to obtain the benefits of the peculiar combination of properties which they possess. They can be used in treating paper and textile materials to render them waterproof and oilproof and to impart fire-resistance.

Although our homopolymers are insoluble in common organic solvents, they nevertheless are soluble in certain other solvents and this is a valuable feature as it permits of coating them from solutions. As solvents and plasticizers for these polymers, use can be made of the alkyl esters of fluorocarbon monocarboxylic acids, and of the 1,1-dihydroperfluoroalkyl alcohols and their esters (such as the acetates and higher esters), which contain fluorocarbon chains.

Esters which are lower in the series (containing one or two carbon atoms in the fluorocarbon group) do not form equivalent homopolymers. The homopolymers thereof contain less than 50% fluorine, have materially higher refractive indices, are less resistant to heat, are not highly resistant to oils, and are soluble in common organic solvents (such as methylethyl ketone and methylisobutyl ketone). Polymers containing substantially less than 50% fluorine cannot, in general, be characterized as nonflammable. Thus the presence of three or more carbon atoms in the fluorocarbon portion of the chain has been found to be of critical importance.

So far as we are aware, no previously known polymers of any kind have had the combination of properties possessed by ours and they are believed to be without precedent in respect to properties as well as in respect to specific chemical composition.

The properties of our homopolymers can be modified by making them in such a way that a lower average molecular weight is obtained, the average length of the skeletal chains of the polymeric molecules being shorter. This can be done, for instance, by including a chain transfer agent, such as 0.5 to 10% (by weight relative to the ester) of a mercaptan, in the polymerization recipe. The effect is to make the polymers softer and more thermoplastic. In the case of normally rubbery polymers, rubberiness is decreased and tackiness is increased. Finally, using sufficient mercaptan, instead of a solid rubbery polymer there will be obtained a polymer which is a sticky, viscous liquid at room temperature. Increasing the mercaptan concentration decreases the viscosity still further. These viscid polymers can be used, for instance, for blending with rubbery polymers to obtain pressure-sensitive adhesives which are aggressively tacky and yet are adequately cohesive and elastic, and are suitable for use in making adhesive tapes, as previously mentioned. In the case of normally non-rubbery polymers, the use of increasing amounts of mercaptain results in increasing softness and plasticity and, finally, in viscous oily liquids.

Mixed polymers can be made by copolymerizing mixtures of different ester monomers as, for example, a mixture of monomers which vary as to the number of carbon atoms in the fluorocarbon group, or as to the fluorocarbon group being normal or branched, or both. The polymer molecule will then be made up of differing ester units and the properties can be varied in this way. Esters of our series (3 to 9 carbon atoms in the fluorocarbon group) can be copolymerized with esters containing less than 3 or more than 9 carbon atoms in the fluorocarbon group to obtain a modification of properties.

In addition to polymers formed solely from 1,1-dihydroperfluoroalkyl acrylate ester monomers, novel heteropolymers can be made by copolymerizing a mixture of one or more of our esters and one or more polymerizable monomers of other types which contain an ethylenic linkage (such as styrene, acrylonitrile, butadiene, isoprene, vinyl ethers, acrylates, methacrylates, and halogenated derivatives of such monomers), so as to obtain a polymeric molecular structure having different types of side chains bonded to the skeletal vinyl chain of the polymer molecule. Copolymers formed with dienes can be cured with conventional sulfur recipes.

The present acrylate ester monomers can be copolymerized with fluorocarbon vinyl ester monomers having the formula $R_fCOOCH:CH_2$, where $R_f$ is a saturated fluorocarbon radical. Examples of the latter monomers are given in the copending application of one of us, T. S. Reid, S. N. 214,025, filed March 5, 1951, since issued as Patent No. 2,592,069 on April 8, 1952. They can also be copolymerized with 1,1-dihydroperfluoroalkyl methacrylate ester monomers.

The properties of the polymer masses can also be varied by the use of plasticizers (such as high-boiling alkyl esters of fluorocarbon monocarboxylic acids), and by compounding with carbon black and other finely divided solid materials such as zinc oxide and precipitated calcium carbonate. Other pigments can be included. The stiffness and the heat-resistance of the polymer mass can be increased by including a small proportion of a poly-functional polymerizable compound at the time of polymerization to cause cross-linking between the skeletal chains and thereby form a three-dimensional network. Hard polymers can be obtained by using sufficient cross-linking agent. An illustration of fluorinated cross-linking monomers is provided by the diacrylate esters of the monohydrates of fluorocarbon aldehydes, described in the patent of two of us, Husted and Ahlbrecht, No. 2,568,501 (September 18, 1951); for instance, the n-heptafluorobutyraldehydrol diacrylate ester, $$CF_3(CF_2)_2CH(OOCCH:CH_2)_2.$$

The use of these various expedients for modifying the properties of polymer masses is understood by those skilled in polymer chemistry and need not be elaborated upon.

PREPARATION OF ESTER MONOMERS

The polymerizable ester monomers of this invention cannot be readily formed by direct esterification of acrylic acid with the fluorinated alcohol.

A preferred procedure is to react the acid chloride derivative of acrylic acid, rather than the acid, with the fluorinated alcohol. Reaction in the presence of barium chloride ($BaCl_2$) readily takes place at moderate temperatures to produce, after several hours of heating under reflux conditions, a high yield of the desired ester product, which can be recovered by fractional distillation in the presence of hydroquinone to inhibit polymerization.

The fluorinated primary alcohols employed as starting compounds in making the fluorinated acrylate ester monomers of this invention are, as previously mentioned, the 1,1-dihydroperfluoroalkyl alcohols, having the general formula:

$$C_nF_{2n+1}CH_2OH$$

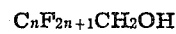

where $n$ has a value of 3 to 9.

These fluorinated alcohols can be prepared by the reduction of the fluorocarbon monocarboxylic acids which have a corresponding fluorocarbon radical, using lithium aluminum hydride ($LiAlH_4$) as the reduction agent in an anhydrous ether vehicle. By this procedure the alcohols, $C_nF_{2n+1}CH_2OH$, are formed by the reduction of the corresponding acids, $C_nF_{2n+1}COOH$. Instead of using the fluorocarbon acids, use can be made of the corresponding fluorocarbon acid chlorides, $C_nF_{2n+1}COCl$, as starting compounds for reduction to the desired alcohols.

These alcohols can also be prepared in pure form by catalytic hydrogenation of the alkyl esters (e. g., methyl and ethyl esters) of the fluorocarbon monocarboxylic acids, using a copper chromium oxide type of catalyst, and elevated temperatures (e. g., 200° C.) and high pressures (e. g., at least 1,500 lbs/sq. in.). For instance, the desired alcohols can be prepared from the methyl esters, having the formula $$C_nF_{2n+1}COOCH_3$$

The above methods of making the alcohols are described in detail in the copending joint application of two of us, D. R. Husted and A. H. Ahlbrecht, S. N. 164,611, filed on May 26, 1950, wherein these alcohols are claimed, and reference may be made thereto. Heptafluorobutyric acid and various of its derivatives, including the acid chloride and the alkyl esters, have been described in a brochure published by Minnesota Mining & Manufacturing Company (St. Paul, Minnesota) in October 1949, as advertised in Chemical and Engineering News, issue of October 17, 1949, at page 3061. This and higher acids of the series are described and claimed in the patent of Diesslin, Kauck & Simons, No. 2,567,011 (September 4, 1951). See, also, the paper of Kauck & Diesslin published in the October 1951 issue of Industrial and Engineering Chemistry (vol. 43, pp. 2332-34).

*Example 1*

The reaction vessel was a flask equipped with a stirring device and a thermometer, and fitted with a reflux condenser and drying tube. To the flask, containing 1 gram of barium chloride ($BaCl_2$), were added 14.9 grams of normal 1,1-dihydroheptafluorobutyl alcohol $$(n-C_3F_7CH_2OH)$$

and 10.0 grams of acrylyl chloride $CH_2:CHCOCl$). A few crystals of hydroquinone were added and the mixture was heated for 5 hours at approximately 60° C. The mixture was fractionally distilled to yield 14.4 grams of a fraction which was identified as normal 1,1-dihydroheptafluorobutyl acrylate, having the formula:

$$CH_2:CHCOOCH_2(CF_2)_2CF_3$$

This material was a clear, colorless liquid which was found to have a vacuum boiling point of 43° C. (at 40 mm.), a room pressure boiling point (micro) of 122° C. at 743 mm., a refractive index (at 20° C.) of 1.33, and a density (grams/cc. at 20° C.) of 1.455. For the pure compound, the calculated molecular weight is 254 and the percentage of fluorine by weight is 52.3%.

A more highly purified sample of this ester monomer was found to have a refractive index (at 20° C.) of 1.332.

*Example 2*

This example illustrates the preparation of the acrylate ester by reaction of the alcohol with equimolar amounts of acrylic acid and of the anhydride of trifluoroacetic acid, in the presence of copper serving as a polymerization inhibitor. The trifluoroacetic anhydride serves as an esterification promotor and yields trifluoroacetic acid as a reaction product of the process.

The apparatus was a 3-necked 500 ml. glass flask equipped with a water-cooled reflux condenser, a glass stirrer, and a dropping funnel; which was cooled by a stirred water bath. The flask was charged with 72 grams (1.00 mole) of acrylic acid and 0.3 g. of copper flakes. Then 215 grams (1.02 moles) of trifluoroacetic anhydride, $(CF_3CO)_2O$ was added over a 15 minute period, maintaining a pot temperature of less than 40° C. There was then added 200 grams (1.00 mole) of normal 1,1-dihydroheptafluorobutyl alcohol during a 20 minute period, while keeping the pot temperature at 40° C. by cooling. The trifluoroacetic acid reaction product was fractionated off at 30 mm. pressure, after the mixture had been stirred an additional 10 minutes, to a head temperature of 40° C.

The residue was then washed 3 times with equal volumes of water, 10% sodium carbonate solution, and water, respectively. The yield of wet ester was 233 grams (92%). After drying with calcium chloride, the product had a refractive index at 20° C. of 1.3316, and was identified as substantially pure 1,1-dihydroheptafluorobutyl acrylate.

*Example 3*

This example illustrates the preparation of 1,1-dihydroperfluorohexyl acrylate, by the reaction of the alcohol with acrylyl chloride in the presence of barium chloride.

The apparatus was a 3-necked 50 ml. glass flask equipped with a nitrogen inlet tube, a thermometer, a water-cooled reflux condenser fitted with a calcium chloride drying tube, and a magnetic stirrer. The apparatus had previously been oven-dried at 120° C. and assembled while hot. The flask was charged with 12.7 g. (0.14 moles) of acrylyl chloride, 21.0 g. (0.070 moles) of normal 1,1-dihydroperfluorhexyl alcohol, $$CF_3(CF_2)_4CH_2OH$$

2.0 g. (0.0096 moles) of $BaCl_2$, 0.1 g. of hydroquinone, and 0.1 g. of copper flakes. Nitrogen was passed through the system at the rate of one bubble per second. The temperature was raised in 4 minutes to 60° C. by using an electrical heating mantle, and then gradually over 13½ hours to a maximum of 75° C.

Fractionation of the resulting mixture gave 20.9 grams (84.3% yield) of $$CH_2:CHCOOCH_2(CF_2)_4CF_3$$

which had a boiling point of 62° C. at 20 mm., 70° C. at 30 mm., and 157° C. at 734 mm. (micro). The density at 30° C. was 1.540 and the refractive index at 20° C. was 1.3279. Analysis for fluorine gave 55.6% (59.1% calc.). The saponification equivalent was 348 (354 calc.).

*Example 4*

This example illustrates the preparation of 1,1-dihydroperfluorooctyl acrylate by a modification of the procedure of the previous example.

The flask was initially charged with 10.0 g. (0.025 moles) of normal 1,1-dihydroperfluorooctyl alcohol, $CF_3(CF_2)_6CH_2OH$, 0.6 g. (0.0029 moles) of $BaCl_2$, and 0.1 g. of pyrogallic acid; to which was added 4.5 g. (0.050 moles) of acrylyl chloride. Stirring was started and nitrogen was passed through at the rate of two bubbles per second. The temperature was raised in 12 minutes to 60° C. and then gradually over 16½ hours to a maximum of 79° C.

Fractionation of the resulting mixture gave 7.3 grams (64.3% yield) of $$CH_2:CHCOOCH_2(CF_2)_6CF_3$$

which had a vacuum boiling point of 65° C. at 5 mm. The density and refractive index at 20°

C. were 1.631 and 1.3279, respectively. Fluorine: 60.7% (found), 62.8% (calc.).

Example 5

This example illustrates the preparation of 1,1-dihydroperfluorodecyl acrylate. The procedure was essentially the same as in Example 3.

The charge consisted of 20.0 g. (0.040 moles) of 1,1-dihydroperfluorodecyl alcohol, $$CF_3(CF_2)_8CH_2OH$$

1.0 g. (0.0048 moles) of $BaCl_2$, 0.1 g. of hydroquinone, and 10.8 g. (0.119 moles) of acrylyl chloride. The temperature was raised to 60° C. in 12 minutes and then rose slowly to a maximum of 97° C. in 1 hour. The mixture was cooled to 70° C. and allowed to remain at this temperature for 1½ hours. Total reaction time was 2¾ hours.

Fractionation of the resulting mixture gave 15.9 grams (71.7% yield) of $$CH_2{:}CHCOOCH_2(CF_2)_8CF_3$$

which had a vacuum boiling point of 66° C. at 1 mm. The density and refractive index at 20° C. were 1.689 and 1.3279, respectively. Fluorine: 62.4% (found), 65.2% (calc.).

Example 6

This example illustrates an alternative procedure in which use is made of approximately equimolar amounts of acrylyl chloride, quinoline and the alcohol, and nitrobenzene is used as the reaction mixture solvent.

The apparatus was a 3-necked 150 ml. glass flask equipped with a glass stirrer, water-cooled reflux condenser, and dropping funnel; which was cooled in an ice bath. The flask was charged with 63.4 g. (0.211 moles) of 1,1-dihydroperfluorohexyl alcohol, 28.2 g. (0.229 moles) of nitrobenzene, 28.4 g. (0.220 moles) of quinoline, and a trace of hydroquinone. With continued stirring, 21 g. (0.23 moles) of acrylyl chloride was added rapidly (5 min.). The temperature reached a maximum of 67° C. and then, as it began to drop, the cooling bath was removed and the stirred mixture was allowed to cool slowly (½ hour).

Fractionation of the resulting mixture gave 61.3 g. (82.5%) of $CH_2{:}CHCOOCH_2(CF_2)_4CF_3$.

PREPARATION OF ESTER HOMOPOLYMERS

A general description has already been given on the homopolymerization of our esters by bulk, solution and emulsion techniques. The following experimental examples are illustrative:

Example 7

This example deals with light-initiated polymerization in bulk of the normal 1,1-dihydroperfluorobutyl acrylate ester monomer, $$CH_2{:}CHCOOCH_2(CF_2)_2CF_3$$

In one experiment three sealed air-free glass ampoules, each containing 2 grams of the ester, were successively shaken on a rocking platform at a distance of approximately one foot below several 275 watt Westinghouse Sunlamps (rich in ultra-violet light emission). Two of the tubes were each exposed under two lamps. They showed no sign of polymerization after 6 hours, but were completely polymerized at the end of 22 hours. The third tube was exposed under three lamps and was polymerized completely at the end of 1 hour.

The experiment was repeated except that in this case each tube also contained 0.005 g. of benzoin as a light sensitizer. Two of the tubes, each exposed under two lamps, had not polymerized after 60 minutes but were completely polymerized at the end of 85 minutes. The third tube, exposed under three lamps, was completely polymerized in less than 40 minutes.

In all cases the polymers were clear, tacky, rubbery materials.

Example 8

This example deals with peroxide-initiated bulk polymerization of the normal 1,1-dihydroperfluorobutyl acrylate ester monomer, and also shows the effect of using varying amounts of a mercaptan to obtain lower average molecular weights, the mercaptan serving as a chain transfer agent.

A series of five ampoules was prepared, each ampoule containing 2 grams of the ester, 0.5 grams of cumene hydroperoxide and, respectively, 0, 0.5, 2.5, 5 and 10% (by weight) of primary dodecyl mercaptan. The ampoules were heated at 50° C. for 40 hours. The first three samples yielded solid, tacky, rubbery polymers; the rubberiness decreasing and the tack increasing with increase of mercaptan. The last two samples were viscous, sticky liquids at room temperature. The inherent viscosities of the four polymers containing mercaptan were respectively: 0.12, 0.04, 0.03 and 0.02.

Example 9

This example deals with peroxide-initiated solution polymerization of the normal 1,1-dihydroperfluorobutyl acrylate ester monomer in chloroform, which acts as a chain transfer agent, resulting in the obtaining of a liquid instead of a solid polymer.

A carefully sealed air-free glass ampoule containing 8 grams of chloroform ($CHCl_3$), 2 grams of the ester, and 0.04 grams of a 25% solution of acetyl peroxide in dimethyl phthalate, was placed in a copper tube fastened on a platform shaker. The tube was heated by an electric heating coil and the temperature was held at 75° C. The ampoule was removed at the end of 44 hours. Although the monomer had been dissolved in the chloroform, two liquid layers were now present, the polymer being of a low molecular weight and being insoluble in the solvent. The liquid polymer was heated in a vacuum oven at 40° C. for two days. The product was a highly viscous, clear liquid that was very tacky.

High polymers, which are tacky rubbery solids, can be obtained by using a substantially inert solvent in which the polymer is soluble, such as methyl heptafluorobutyrate, $C_3F_7COOCH_3$.

Example 10

This example deals with emulsion polymerization in an aqueous vehicle of the normal 1,1-dihydroperfluorobutyl acrylate ester monomer, using potassium persulfate ($K_2S_2O_8$) as the catalyst, to obtain a polymer latex. The emulsion recipe was:

| | Grams |
|---|---|
| $CH_2{:}CHCOOCH_2(CF_2)_2CF_3$ | 10.0 |
| Water | 18.0 |
| "Duponol ME" (emulsifier) | 0.3 |
| $K_2S_2O_8$ (catalyst) | 0.025 |

A 3-necked 50 ml. glass flask equipped with a dropping funnel, a stirrer, and a reflux condenser, was used as the reaction vessel. A thermocouple was taped to the side of the flask, below the liquid level, to record the temperature. Heat was applied by a glass-cloth electrical heating mantle.

The water phase (water, "Duponol ME," and $K_2S_2O_8$) was prepared first and added to the flask. (The "Duponol ME" is a well-known emulsifier of the sodium alkyl sulfate type and is a mixture of sodium salts of alkyl sulfonic acids derived from a mixture of higher alcohols, predominantly lauryl alcohol, and is sold by E. I. du Pont de Nemours & Co.). Flushing with nitrogen was carried out and then the ester monomer was added. A final flushing with nitrogen was carried out with the stirrer going and the temperature was then raised to 40° C. After ½ hour the reaction "kicked off" and the temperature rose to 60° C. At the end of a further 2 hours the polymerization was complete and a transparent latex had formed, having a faint blue coloration. This latex emulsion was found to be quite stable to storage.

The polymer was coagulated from the latex by freezing in a Dry Ice bath. A colorless, rubbery polymer mass was obtained, that was tacky when fully dried. The yield was about 95%.

*Example 11*

This example relates to emulsion polymerization of the normal 1,1-dihydroperfluorohexyl acrylate ester, $CH_2:CHCOOCH_2(CF_2)_4CF_3$. A mercaptan was used to modify the molecular weight.

A clean, four ounce bottle was fitted with a screw cap containing a neoprene liner. The cap had a small center hole to permit sampling and addition of a shortstopping agent with a hypodermic syringe.

The following charge was used:

| | Grams |
|---|---|
| $CH_2:CHCOOCH_2(CF_2)_4CF_3$ | 25.0 |
| Water | 45.0 |
| "Duponol ME" | 0.75 |
| $K_2S_2O_8$ | 0.125 |
| Tertiary hexadecyl mercaptan | 0.00625 |

The water phase was added to the bottle and then the ester monomer, and the system was flushed with nitrogen, and the cap quickly screwed on. The bottle was placed in an end-over-end rotator heated by a water bath controlled by a thermostat. The water temperature was 50° C.

After 21 hours the bottle was removed and it was observed that a translucent latex had formed. The reaction was stopped by injecting 5 ml. of a saturated water solution of phenylethanolamine contained in a hypodermic syringe. About 8% of precoagulum had formed but the total conversion was 100%. Recovery of the polymer was performed by diluting the latex four times and coagulating with 10% barium chloride solution. After vacuum drying, the rubbery polymer was sufficiently tacky to stick to the glass container in which it was dried.

*Example 12*

This example illustrates the emulsion polymerization of the higher acrylate esters which form polymers that are non-rubbery at room temperature.

The emulsion formula was:

| | Grams |
|---|---|
| Acrylate ester monomer | 0.25 |
| Water | 0.45 |
| "Duponol ME" | 0.0075 |
| $K_2S_2O_8$ | 0.00125 |

Polymerization was conducted in sealed air-free glass ampoules which were heated for three days at 50° C. The latex was coagulated by freezing in a Dry Ice bath.

Coagulation of the latex formed from normal 1,1-dihydroperfluorooctyl acrylate, $$CH_2:CHCOOCH_2(CF_2)_6CF_3$$

produced a slurry of soft crumbs which dried to give soft and plastic particles having very little tack at room temperature. No rubbery properties were discerned at room temperature. Analysis showed 61.7% F (calc. value 62.8%).

Similar processing of the latex formed from normal 1,1-dihydroperfluorodecyl acrylate, $$CH_2:CHCOOCH_2(CF_2)_8CF_3$$

yielded a white wax-like powder. Analysis showed 65.3% F (calc. value 65.2%).

PREPARATION OF ESTER HETEROPOLYMERS

The following experimental examples are illustrative of the preparation of heteropolymers produced by copolymerizing a mixture of one or more of our esters and one or more polymerizable monomers of other types which contain an ethylenic linkage. Copolymerization of our butyl, amyl and hexyl esters with butadiene is of particular interest, yielding vulcanizable rubbery polymers having excellent oil and solvent resistance and good low-temperature properties.

*Example 13*

This experiment illustrates the emulsion copolymerization of 1,1-dihydroperfluorobutyl acrylate and butadiene.

The emulsion recipe was:

| | Grams |
|---|---|
| $CH_2:CHCOOCH_2(CF_2)_2CF_3$ | 88 |
| Butadiene ($CH_2:CHCH:CH_2$) | 12 |
| Water | 180 |
| "Duponol ME" | 3.0 |
| $Na_2B_4O_7$ (dry borax) | 2.0 |
| $Na_2S_2O_8$ (sodium persulfate) | 1.0 |

A crown-capped 16 ounce bottle was used. After flushing the bottle with nitrogen, the "Duponol ME" and the salts were added and then the water. The water was distilled water that had been deoxygenated by boiling and had been kept relatively free of oxygen by continuously bubbling nitrogen through it while cooling, prior to introducing into the bottle. The bottle was then flushed again with nitrogen and the acrylate ester was added, followed by further flushing with nitrogen. An excess of butadiene (condensed from a tank) was added and the surplus was allowed to boil off (flushing oxygen out with it); then the bottle was immediately capped. It was mounted in an end-over-end rotator in a water bath maintained at 45° C. by a thermostat control. The reaction period was 2½ hours.

The bottle was then removed from the bath and opened and 0.1 grams of phenylethanolamine was added as a shortstopper. Then 1 gram of "Santovar A" (as a 10% solution in methanol) was added to provide an anti-oxidant, and the latex was coagulated by freezing. (The "Santovar A" is a well-known anti-oxidant, sold by Monsanto Chemical Co., and is 2,5-di-tert-amylhydroquinone). The resultant copolymer mass was washed with tap water for 1 hour, and then was subjected to vacuum drying at 40° C. for 24 hours. The dry copolymer was a strong and snappy rubbery material. The conversion was 74%. The copolymer contained 78% by weight of the acrylate component and had a fluorine content of 41%.

Coagulation of the latex can also be achieved by thrice diluting with water and adding a coagulating agent, such as a 10% barium chloride solution.

Example 14

This experiment was similar to the preceding one except that a 1,1-dihydroperfluorohexyl acrylate monomer was employed and the polymerization vessel was a sealed ampoule. The copolymer product was a strong and snappy rubbery material containing 46% fluorine (78% by weight of the acrylate component). The conversion was 85%. The following emulsion recipe was used:

|  | Grams |
| --- | --- |
| $CH_2{:}CHCOOCH_2(CF_2)_4CF_3$ | 8.68 |
| Butadiene | 1.32 |
| Water | 18.00 |
| "Duponol ME" | 0.30 |
| $Na_2B_4O_7$ | 0.20 |
| $Na_2S_2O_8$ | 0.10 |

The hexyl acrylate copolymers appear to be superior to the butyl acrylate copolymers in combined gasoline resistance and low-temperature flexibility.

Example 15

These experiments illustrate copolymerization with acrylonitrile. The acrylate monomer was 1,1-dihydroperfluorobutyl acrylate. The procedure was similar to that described above in Example 13. The emulsion recipe was:

|  | Grams |
| --- | --- |
| $CH_2{:}CHCOOCH_2(CF_2)_2CF_3$ | 100 |
| Acrylonitrile ($CH_2{:}CHCN$) | varied |
| Water | 180 |
| "Duponol ME" | 3.0 |
| $K_2S_2O_8$ | 0.5 |
| Tertiary hexadecyl mercaptan | 0.25 |

The water bath temperature was 50° C. and the reaction time was 4 hours, producing conversions of 95 to 100%. When the amount of acrylonitrile employed in the formula was in the range of 0 to 7 grams, the copolymer product was quite rubbery. When the amount was increased above 7 grams, the copolymer became progressively more stiff and less rubbery.

These acrylonitrile copolymers are of particular interest because they provide rubbery materials that resist swelling by fluorinated solvents as well as by non-fluorinated solvents and oils.

Example 16

This experiment illustrates the use of three monomers of different types to obtain terpolymers by interpolymerization, namely, 1,1-dihydroperfluorobutyl acrylate, butadiene and acrylonitrile. The procedure was similar to that noted above. A conversion of 56% was obtained, employing a temperature of 40° C. and a period of 2 hours and 40 minutes. The formula was:

|  | Grams |
| --- | --- |
| $CH_2{:}CHCOOCH_2(CF_2)_2CF_3$ | 20.6 |
| Butadiene | 4.4 |
| Acrylonitrile | 1.25 |
| Water | 45 |
| $Na_2B_4O_7$ | 0.25 |
| $Na_2S_2O_8$ | 0.25 |

The terpolymer product was a tough rubbery material. Analysis showed 33% fluorine and 1.1% nitrogen. The use of a small amount of acrylonitrile toughens the polymer and improves the impact resistance at low temperatures.

Illustrations of other heteropolymers that have been made and which are of a rubbery character can be summarized as follows:

(1) A copolymer of 1,1-dihydroperfluorobutyl acrylate and n-octyl acrylate, containing 26% of the fluorinated acrylate.

(2) A copolymer of 1,1-dihydroperfluorobutyl acrylate and dihydrodicyclopentenyl acrylate, containing 83% of the fluorinated acrylate.

(3) A copolymer of 1,1-dihydroperfluorobutyl acrylate and chlorethyl vinyl ether, containing 80% of the fluorinated acrylate.

(4) A copolymer of 1,1-dihydroperfluorobutyl acrylate and chlorethyl acrylate, containing 67% of the fluorinated acrylate.

(5) A copolymer of 1,1-dihydroperfluorobutyl acrylate and divinyl ether, containing 85% of the fluorinated acrylate.

(6) A terpolymer formed from 64% of 1,1-dihydroperfluorobutyl acrylate, 22.5% of 2-chloroperfluorobutadiene, and 13.5% of butadiene.

(7) A terpolymer formed from 63.3% of 1,1-dihydroperfluorobutyl acrylate, 19.5% of 2-chloroperfluorobutadiene, and 17.2% of isoprene.

VULCANIZATION

The fluorinated acrylate homopolymers can be successfully cured by two types of recipes. One method is to use rather large amounts of oxides of bivalent metals, such as magnesium oxide and lead oxide. The second method is to use a hydrate of an alkali-metal silicate in combination with a base such as calcium hydroxide. Both methods provide vulcanizates of rubbery acrylate polymers which have tensile strength values of 700 to 1,000 p. s. i. The metal oxide vulcanizates are less sensitive to water and they have better heat-aging properties. The silicate vulcanizates are more lively and display lower permanent set.

The heteropolymers containing dienes can be vulcanized with conventional sulfur recipes as well as by using the metal oxide and the silicate formulas.

The usefulness of the rubbery homopolymers and heteropolymers of our invention is greatly enhanced by their ability to be vulcanized. Swelling in solvents is diminished, tensile strength is increased, and it is possible to produce articles of varied and useful shapes.

The following are representative experimental examples:

Example 17

A rubbery 1,1-dihydroperfluorobutyl acrylate polymer was vulcanized by using metallic oxides; the recipe being as follows:

|  | Parts by weight |
| --- | --- |
| Polymer | 100 |
| Litharge (PbO) | 5 |
| Magnesium oxide (MgO) | 25 |
| Stearic acid | 2 |

The polymer was banded on a mill at a roll temperature of 60° C. and the stearic acid was milled in. The litharge and then the magnesium oxide were added to the well-worked mass on the mill. Vulcanization was performed in a press under 1800 p. s. i. pressure and at a temperature of 310° F. for a period of 1 hour. The cured polymer was a strong, rubbery material having a tensile strength of 850 p. s. i. and an elongation at break of 350%.

Example 18

A rubbery copolymer of 1,1-dihydroperfluorobutyl acrylate and butadiene (prepared as described in Example 13) was vulcanized by the silicate method, using the following formula:

| | Parts by weight |
|---|---|
| Copolymer | 100 |
| $Ca(OH)_2$ | 2.72 |
| $Na_2SiO_3 \cdot 9H_2O$ | 6.72 |

The copolymer mass was banded on a mill at 60° C. and the calcium hydroxide was then milled in until the batch was homogeneous. Finally the sodium silicate was added and mixed in thoroughly, the temperature being sufficient to fuse the silicate salt when added to the batch on the rolls. The milling cycle was 25 minutes. Vulcanization was performed in a press at 1800 p. s. i. and at a temperature of 310° F. for 2 hours. The product had a tensile strength of 1,000 p. s. i. and an elongation at break between 200 and 300%.

Example 19

A rubbery copolymer of 1,1-dihydroperfluorobutyl acrylate and butadiene, containing 36% fluorine, was vulcanized with sulfur, using the following recipe:

| | Parts by weight |
|---|---|
| Copolymer | 100 |
| Stearic acid | 1 |
| Zinc oxide (activator) | 5 |
| Mercaptobenzothiazyl disulfide (accelerator) | 2 |
| Sulfur | 3 |
| Carbon black (EPC) | 50 |

The ingredients were mixed together on a mill at 60° C. The carbon black served as a reinforcing pigment and a distinct reinforcing action was apparent. Vulcanization was performed in a press at 1800 p. s. i. and at a temperature of 310° F. for 1 hour. The product had a tensile strength of 1,400 p. s. i. and an elongation at break of 170%.

The use of vulcanization is not restricted to the rubbery high-polymers. Mention has been made of the polymers of intermediate molecular weight which are sticky viscous liquids. These can be vulcanized so as to increase cohesive strength, thereby firming and stiffening the polymer mass, but without carrying the vulcanization to the point where tackiness is lost. In this way pressure-sensitive adhesives can be compounded which are rubbery and are more cohesive than adhesive and yet are aggressively tacky, and are suitable for use in making pressure-sensitive adhesive tapes. Heteropolymers containing dienes are particularly suited for use in making such vulcanized adhesives.

Diene-containing heteropolymers can also be "vulcanized" by compounding with a phenol-aldehyde resin of the alkaline-condensed heat-reactive oil-soluble type and an activator (such as zinc oxide), and heating. (An example of such a resin is "Bakelite BR-14634," which is understood to be a para-tertiary-butyl-phenol formaldehyde resin made with an alkaline catalyst and with between 1.5 and 2.0 mols of formaldehyde for each mol of substituted phenol.

We claim:

1. As new compounds, the 1,1-dihydroperfluoroalkyl acrylates having the formula:

$$CH_2{:}CHCOOCH_2C_nF_{2n+1}$$

where $n$ has an integer value of 3 to 9.

2. The compound 1,1-dihydroheptafluorobutyl acrylate, having the formula:

$$CH_2{:}CHCOOCH_2C_3F_7$$

3. The compound 1,1-dihydrononafluoroamyl acrylate, having the formula:

$$CH_2{:}CHCOOCH_2C_4F_9$$

4. Normal 1,1-dihydroperfluorohexyl acrylate, having the formula:

$$CH_2{:}CHCOOCH_2(CF_2)_4CF_3$$

5. Normal 1,1-dihydroperfluorooctyl acrylate, having the formula:

$$CH_2{:}CHCOOCH_2(CF_2)_6CF_3$$

6. Normal 1,1-dihydroperfluorodecyl acrylate, having the formula:

$$CH_2{:}CHCOOCH_2(CF_2)_8CF_3$$

7. Homopolymers of the 1,1-dihydroperfluoroalkyl acrylate monomers having the formula:

$$CH_2{:}CHCOOCH_2C_nF_{2n+1}$$

where $n$ has an integer value of 3 to 9.

8. Solid homopolymers of the 1,1-dihydroperfluoroalkyl acrylate monomers having the formula:

$$CH_2{:}CHCOOCH_2C_nF_{2n+1}$$

where $n$ has an integer value of 3 to 9.

9. Liquid homopolymers of the 1,1-dihydroperfluoroalkyl acrylate monomers having the formula:

$$CH_2{:}CHCOOCH_2C_nF_{2n+1}$$

where $n$ has an integer value of 3 to 9.

10. Polymers having a skeletal chain containing fluorinated acrylate ester units indicated by the formula:

$$\begin{array}{c} \mathrm{HCH} \\ | \\ \mathrm{HC-C} \\ | \quad\;\; \diagdown \\ \quad\quad \mathrm{OCH_2(C_nF_{2n+1})} \end{array}$$

where $n$ has an integer value of 3 to 9.

11. Rubbery polymer having a skelatal chain containing fluorinated butyl acrylate ester units indicated by the formula:

$$\begin{array}{c} \mathrm{HCH} \\ | \\ \mathrm{HC-C} \\ | \quad\;\; \diagdown \\ \quad\quad \mathrm{OCH_2(CF_2)_2CF_3} \end{array}$$

12. Rubbery polymers having a skeletal chain containing fluorinated amyl acrylate ester units indicated by the formula:

$$\begin{array}{c} \mathrm{HCH} \\ | \\ \mathrm{HC-C} \\ | \quad\;\; \diagdown \\ \quad\quad \mathrm{OCH_2(CF_2)_3CF_3} \end{array}$$

13. Rubbery polymers having a skeletal chain containing fluorinated hexyl acrylate ester units indicated by the formula:

$$\begin{array}{c} \mathrm{HCH} \\ | \\ \mathrm{HC-C} \\ | \quad\;\; \diagdown \\ \quad\quad \mathrm{OCH_2(CF_2)_4CF_3} \end{array}$$

14. Vulcanized rubbery polymers having a skeletal chain containing fluorinated acrylate ester units indicated by the formula:

$$\begin{array}{c} \mathrm{HCH} \\ | \\ \mathrm{HC-C} \\ | \quad\;\; \diagdown \\ \quad\quad \mathrm{OCH_2(C_nF_{2n+1})} \end{array}$$

where $n$ has an integer value of 3 to 5.

15. Rubbery copolymers of butadiene and 1,1-dihydroperfluoroalkyl acrylate monomers having the formula:

$$CH_2{:}CHCOOCH_2C_nF_{2n+1}$$

where $n$ has an integer value of 3 to 5.

16. Vulcanized rubbery copolymers of butadiene and 1,1-dihydroperfluoroalkyl acrylate monomers having the formula:

$$CH_2{:}CHCOOCH_2C_nF_{2n+1}$$

where $n$ has an integer value of 3 to 5.

ARTHUR H. AHLBRECHT.
THOMAS S. REID.
DONALD R. HUSTED.

No references cited.